United States Patent [19]
Graham

[11] Patent Number: 5,731,783
[45] Date of Patent: Mar. 24, 1998

[54] METHOD AND APPARATUS FOR ESTIMATING RADAR SIGNAL POLARISATION

[75] Inventor: Stephen Paul Martin Graham, Hove, United Kingdom

[73] Assignee: Racal Radar Defence Systems Limited, Bracknell, England

[21] Appl. No.: 590,277

[22] Filed: Jan. 23, 1996

[30] Foreign Application Priority Data

Jan. 27, 1995 [GB] United Kingdom ............... 9501670

[51] Int. Cl.$^6$ ........................................ G01S 7/28
[52] U.S. Cl. .................... 342/188; 342/153; 342/194
[58] Field of Search ........................ 342/13, 188, 149, 342/152, 153, 194

[56] References Cited

U.S. PATENT DOCUMENTS

| | | | |
|---|---|---|---|
| 3,210,762 | 10/1965 | Brabant | 342/362 |
| 4,025,920 | 5/1977 | Reitboeck et al. | 342/13 |
| 4,231,037 | 10/1980 | Long | |
| 4,323,898 | 4/1982 | Barnes et al. | 342/90 |
| 4,323,899 | 4/1982 | Barnes et al. | 342/90 |
| 4,533,916 | 8/1985 | Williams | 342/80 |
| 4,660,044 | 4/1987 | Lavelle | 342/188 |
| 4,849,762 | 7/1989 | Barnes | 342/188 |
| 4,937,582 | 6/1990 | Mohuchy | 342/188 |
| 5,323,166 | 6/1994 | Nguyen | |
| 5,469,165 | 11/1995 | Milroy | 342/13 |

FOREIGN PATENT DOCUMENTS 2 083 725  3/1982  United Kingdom.

OTHER PUBLICATIONS

"Two Dimensional Angle and Polarization Estimation With a Simple Dipole Array," R. T. Compton, Jr., Antennas and Propagation Society Symposium, vol. 1, 1991, pp. 352–355.

*Primary Examiner*—John B. Sotomayor
*Attorney, Agent, or Firm*—Evenson, McKeown, Edwards & Lenahan, P.L.L.C.

[57] ABSTRACT

This invention relates to a method and apparatus by which a coarse estimate of radar signal polarisation can be obtained. An array comprises at least three differently directed detectors. The polarisation is estimated by measuring an amplitude relationship, such as a ratio of amplitudes, for two adjacent detectors and for two non-adjacent detectors. This provides sufficient information to obtain a coarse estimate of the polarisation state, obtainable by using the value of the amplitude relationship for the two adjacent detectors together with a look-up table to estimate values of the amplitude relationship for the two non-adjacent detectors for different polarisation states, and then comparing the measured and estimated values for this amplitude relationship.

12 Claims, 3 Drawing Sheets

METHOD AND APPARATUS FOR ESTIMATING RADAR SIGNAL POLARISATION

BACKGROUND OF THE INVENTION

1. Field of the Invention

This invention relates to a method and apparatus by means of which a coarse estimate of radar signal polarisation can be obtained in an amplitude monopulse Electronic Support Measures (ESM) system, for the purposes of assisting in DOA (direction of arrival) estimation and "emitter" identification.

2. Description of Related Art

Radar equipments generally transmit signals at a fixed polarisation, e.g. horizontal (H), vertical (V), or less commonly, circular polarisation. Some radars are able to switch between the various polarisations, but these are relatively rare.

ESM systems are used to detect and identify radar emissions in order to provide tactical and/or strategic information about the electromagnetic environment within the detection range of the ESM System. The radar parameters which are generally measured include amplitude, frequency, pulse repetition interval (PRI), pulse width, direction of arrival (DOA), scan type/period and the various inter and intra pulse agilities which can be applied to these parameters.

This information is compared with a library of emitter data which is frequently stored within the equipment in order to determine the identity of the radar type, its mode of operation and hence, perhaps, the intentions of the platform on which it is mounted.

The estimation of signal polarisation also provides another parameter to help in pulse train deinterleaving. ESM systems receive signals from a multitude of radars at the same time. These signals have to be sorted into a multitude of separate pulse trains each containing pulse data from a single emitter, before they can be submitted to the identification library. This process is known as deinterleaving. Any additional parameter which would help discriminate one emitter from another would aid this process, and polarisation is such a parameter.

Due to constraints placed upon the radar designer, the nature of the emissions required for a particular mode of operation in a given radar can be similar to those required by any other radar operating in a similar mode, so the library parameter ranges for any radar may well overlap those of others. As a result, the accuracy of emitter identification routines is often limited to the provision of a list of possibilities with perhaps a confidence level attached to each one. Any additional parameters which could aid the removal or reduction of such ambiguities would be useful. Signal polarisation is one such parameter. Until now, measuring the polarisation of an incoming signal has involved a significant increase in cost, because of the need for additional receiver channels to measure it.

DOA is frequently estimated by amplitude comparison of the ports in a circular array of between, say, four and eight antennas disposed at angular spacings of from 90° to 45° as the case may be. Since signal polarisation is unknown, DOA algorithms have to assume an average response between the "V" and "H" antenna patterns, to generate amplitude ratios from which a DOA can be calculated. The axial ratio of the antennas causes the "V" and "H" patterns to be different and is often the biggest single source of DOA error in an amplitude monopulse array of this type. This error could be substantially reduced if signal polarisation was known.

SUMMARY OF THE INVENTION

It is an object of the present invention to provide means by which at least a coarse level of signal polarisation can be deduced from the amplitude ratio between antennas responses of the antennas already available in an amplitude monopulse ESM system, which is sufficient to improve both emitter identification and DOA accuracy.

Variations in antenna beamwidth between H and V polarisation cause the slope of the amplitude versus DOA to be different depending on the signal polarisation. This is shown in FIG. 1 of the accompanying drawings. This gives rise to increasing positive errors as the emitter moves away from antenna crossovers in one case and negative ones in the other. FIG. 1 shows the slope as greater for vertical polarisation than for horizontal polarisation, but it could be the opposite, depending on antenna type.

It will be appreciated that DOA accuracy could therefore be improved, in cases where the antenna axial ratio is significantly different from 0 dB, if the signal polarisation was known.

Polarisation measurement can be performed directly, but in commonly used system architectures it would be expensive to do so, since it would be necessary to produce dual polarised antennas and either double-up on the rf channels or switch from measuring one polarisation to the other within a single pulse, neither of which is particularly attractive.

The present invention is based on a quite different approach, namely to deduce the signal polarisation from the difference between the adjacent and alternate antenna amplitude ratios, rather than to measure it directly. This approach is possible because the two primary polarisations ("V" and "H") provide different amplitude ratios at a given DOA for adjacent and alternate antenna pairs, as a result of the differences already mentioned between the slope of amplitude versus DOA for the two polarisations.

Accordingly the invention provides a method of estimating the polarisation of an incoming electromagnetic signal, using an array of at least three differently directed detectors, comprising determining the amplitude relationship of two adjacent detectors and the amplitude relationship of two non-adjacent detectors, and estimating the said polarisation therefrom. Preferably the two non-adjacent detectors are alternate detectors of the array. More preferably, at any given moment in time the method employs the detector at which the amplitude is largest as one of the pair of adjacent detectors, and the two detectors on either side thereof as the two non-adjacent detectors. Preferably, each of the above mentioned amplitude relationships is the ratio of the amplitudes concerned.

The invention further provides an apparatus for estimating the polarisation of an incoming electromagnetic signal, comprising an array of at least three differently directed detectors, means for determining the amplitude relationship of two adjacent detectors and the amplitude relationship of two non-adjacent detectors, and means for estimating the said polarisation therefrom.

DESCRIPTION OF THE PREFERRED EMBODIMENT

Figure 1:
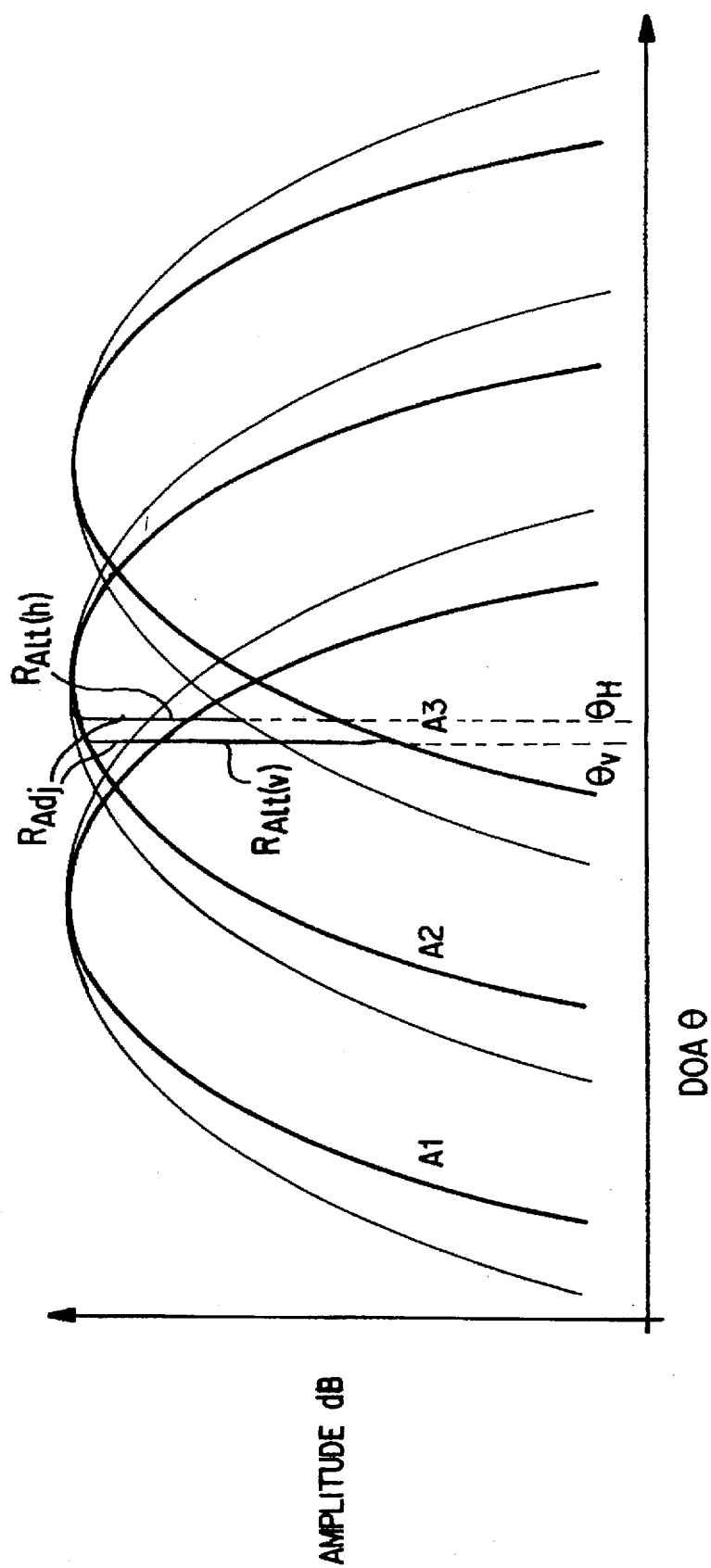
FIG. 1 is a representation of amplitude relationships between adjacent and alternate antenna pairs.

Assuming for the moment that we are dealing with either "H" or "V" polarised signals, then the system will measure an amplitude ratio of $R_{Adj}$(dB) between two adjacent antennas (A1–A2). (See FIG. 1.) The DOA of this signal would conventionally be determined from a look-up table containing the average of $\theta_V$ and $\theta_H$, the directions of arrival of the vertically and horizontally polarised signals respectively.

If, however, we keep $\theta_V$ and $\theta_H$ separate, inspection of the amplitude ratio $R_{Alt}$ from an alternate pair of antennas (A1–A3) at both $\theta_V$ and $\theta_H$ will show a significant difference between the expected ratios of "V" or "H" polarisations. Thus, if $R_{Alt}$-$R_{Adj}$<k we have horizontal polarisation, where R*** is the amplitude ratio in dB and k is constant for any given frequency (typically 3–4 dB, depending on antenna axial ratio), $R_{Adj}$ being the amplitude ratio for a pair of adjacent antennas and $R_{Alt}$ being the amplitude ratio for an alternate pair of antennas.

Thus, based on our prior knowledge of the expected performance of the antennas for the two primary polarisations, if the value of $R_{Alt}$ expected for vertical polarisation on the basis of the measured value of $R_{Adj}$, minus the measured $R_{Alt}$ equals zero then we must have vertical polarisation. Similarly if the expected $R_{Alt}$ for horizontal polarisation minus the measured $R_{Alt}$ is zero then we must have horizontal polarisation.

In practice, received signal polarisations will be impure as a result of multipath of various forms, aircraft attitude (for an airborne radar), and other factors and there will occasionally be circularly polarised radars as well, so it is necessary to allow for some inaccuracies.

In this case therefore:

If $|R_{Alt}(V)-R_{Alt}(M)| \leq k_1$, and $|R_{Alt}(H)-R_{Alt}(M)| > k_2$ we have vertical polarisation.

Similarly,

If $|R_{Alt}(H)-R_{Alt}(M)| \leq k_2$, and $|R_{Alt}(V)-R_{Alt}(M)| > k_1$ we have horizontal polarisation.

where $k_1$, $k_2$ are constant for any given frequency of incoming signal, $R_{Alt}(M)$ is the measured alternate antenna amplitude ratio, and $R_{Alt}(V)$ and $R_{Alt}(H)$ are the values expected for $R_{Alt}$ for vertical and horizontal polarisation, respectively, on the basis of the measured value of $R_{Adj}$.

In cases where these inequalities are not satisfied the polarisation will be indeterminate.

Figure 3:
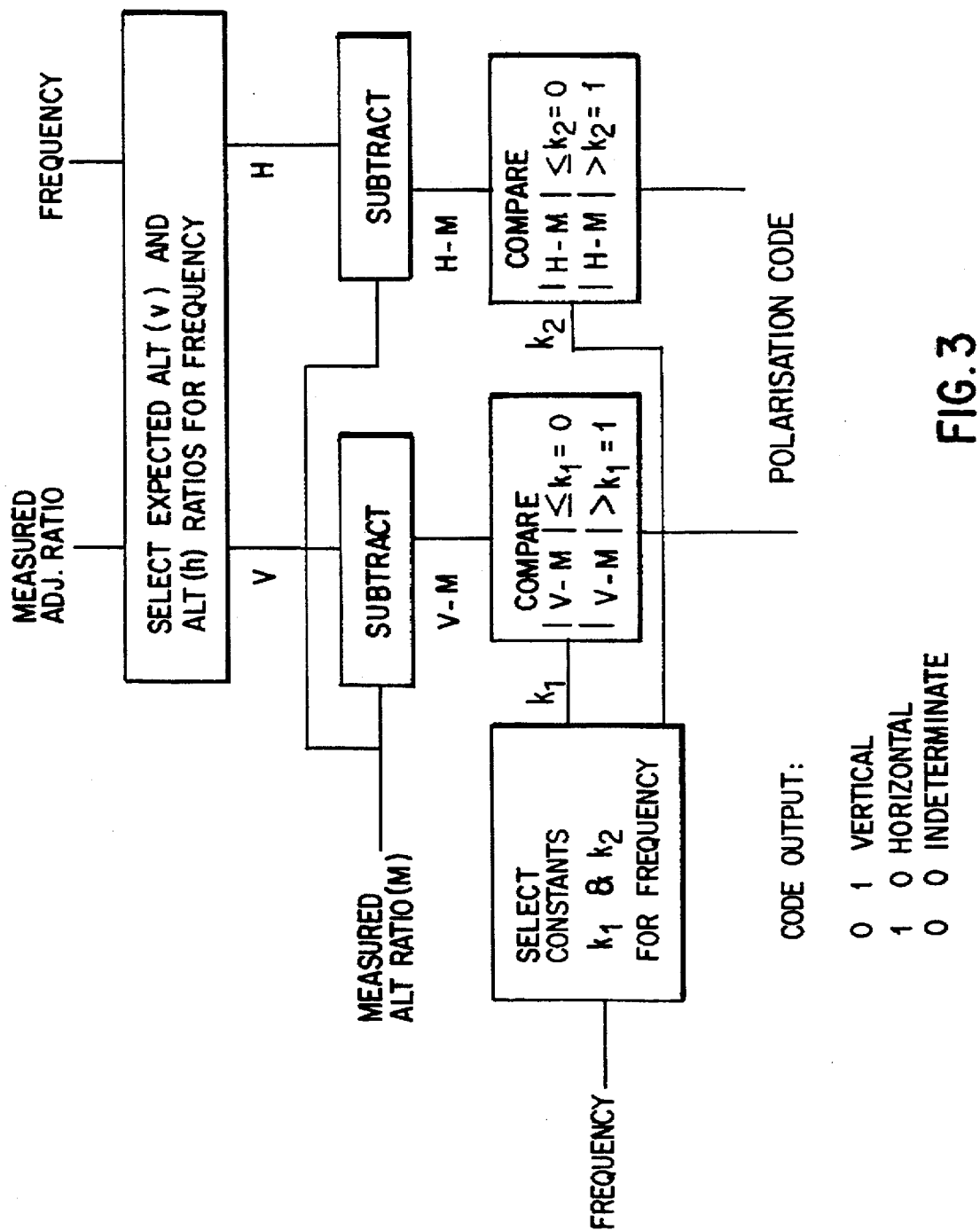
FIG. 3 represents a sequence of steps used to determine polarisation.

FIG. 3 is a flowchart reflecting a sequence of steps which can be used to implement the tests implied by these inequalities.

The present invention can thus be implemented very simply, by expanding the conventional DOA look-up table to include amplitude ratio data for "V" and "H" polarisations, and after the ratio check, attaching a polarisation flag to the normal pulse descriptor word output from an ESM receiver. This approach is limited to an estimate of the presence of "V" or "H" polarisations only, but since these are by far the most common it is a relatively minor limitation.

Using the DOA/amplitude ratio tables for the various polarisations, improved DOA accuracy can be obtained by selecting the appropriate table, rather than using a conventional averaged table, which by definition must always be incorrect.

Figure 2:
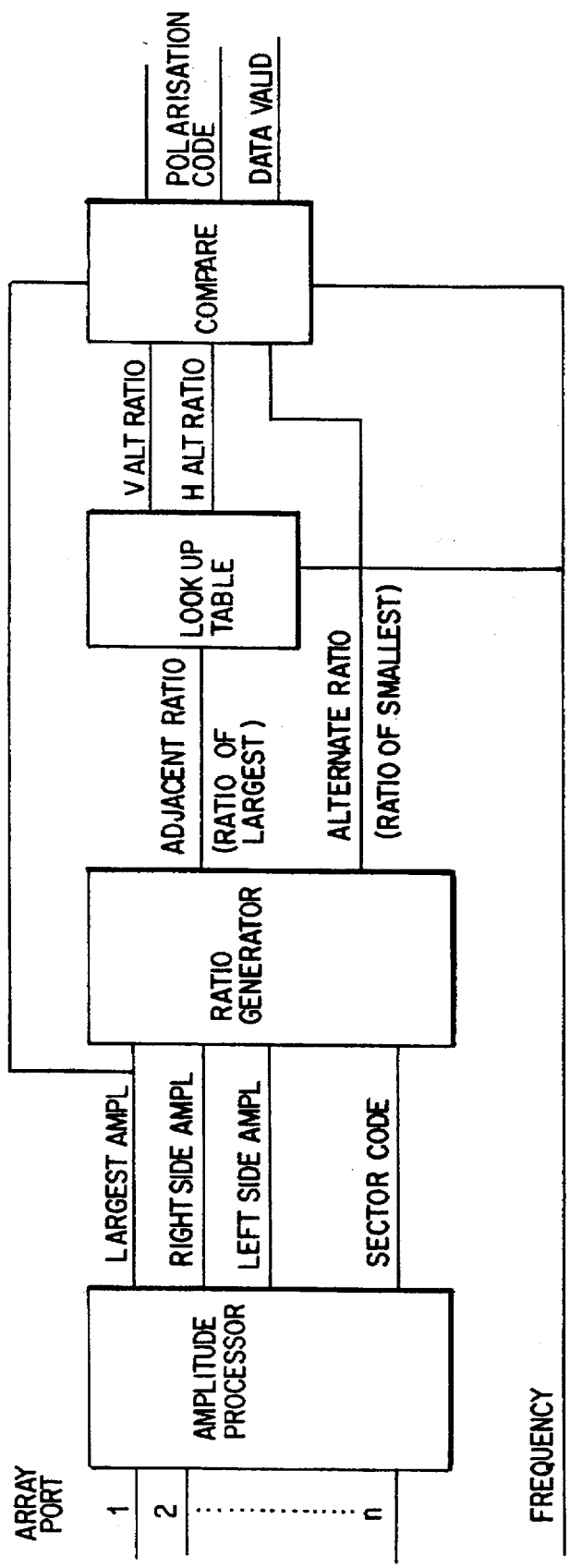
FIG. 2 is a schematic structural representation of the invention.

An embodiment of the invention is shown in the block diagram of FIG. 2. Log signal amplitudes from an n-port array are processed in an amplitude processor to select the largest amplitude and its two neighbours, as well as to generate a sector code from these amplitudes. The sector code is a very coarse indication of bearing, which is calculated purely by reference to which ports are receiving the largest and second largest amplitudes. For example, in a four port system with port 1 at 0°, where the antennas are separated by 90° there would be 8 sectors. If port 1 amplitude was largest and port 2 was second largest then the signal direction must lie between the boresight of port 1 and the crossover of ports 1 and 2 i.e. between 0° and 45°. In its simplest form (which assumes identical and symmetrical antennas) the amplitude ratio versus bearing table (see below) needs only to cover 0° to 45°, since by adding or subtracting this angle to the bearing deduced from the sector code full 360° coverage may be obtained. This approach can save memory and improve flexibility.

A ratio generator then calculates the Adjacent Ratio by subtracting the two largest of the three amplitudes from one another and the Alternate Ratio by subtracting the two smallest amplitudes from one another. The Adjacent Ratio is then used to address a Look Up Table (LUT) which outputs the alternate ratios expected for V and H polarisation for that Adjacent Ratio at the prevailing frequency. A comparator is then able to compare the measured Alternate Ratio with those from the LUT and, by using the constants $k_1$ and $k_2$ for the appropriate frequency, generate the polarisation code.

I claim:

1. A method of estimating polarisation of an incoming electromagnetic signal, using an array of at least three differently directed detectors, each of which produces an output signal with a relationship of amplitude to direction of arrival of the incoming signal which differs for different polarisations of incoming signal, the method comprising the steps of:

determining a first amplitude relationship of output signals of two adjacent detectors and a second amplitude relationship of output signals of two non-adjacent detectors, and estimating said polarisation of the incoming signal from the first and second amplitude relationships without reference to phases of the output signals.

2. A method as claimed in claim 1, wherein the two non-adjacent detectors are alternate detectors of the array.

3. A method as claimed in claim 1, and further comprising the step of employing, at any given moment in time, the detector at which the amplitude is largest as one of the pair of adjacent detectors, and the two detectors on either side thereof as the two non-adjacent detectors.

4. Method as claimed in claim 1, wherein each of said amplitude relationships is the ratio of the amplitudes concerned.

5. Method as claimed in claim 3, wherein each of said amplitude relationships is the ratio of the amplitudes concerned and for the three detectors comprised by the detector at which the amplitude is largest and the detector to either side thereof, the ratio of amplitudes of the two adjacent detectors is provided by subtraction of logarithms of the two largest amplitudes from one another and the ratio of amplitudes of the two non-adjacent detectors is provided by subtraction of logarithms of the two smallest amplitudes from one another.

6. Method as claimed in claim 1, wherein the method further comprises the steps of using a value of said amplitude relationship of said two adjacent detectors to address a look up table, reading off from said look up table predicted values for the amplitude relationship of said two non-adjacent detectors for different polarisation states of said incoming electromagnetic signal, and comparing said value of said amplitude relationship of said two non-adjacent detectors with said predicted values to determine the polarisation state of the incoming electromagnetic signal.

7. Method according to claim 6, wherein in the step of comparing said value of said amplitude relationship of said two non-adjacent detectors with said predicted values, a polarisation code is assigned, whereby said polarisation code is assigned by comparing, for each one of the polarisation states for which predicted values are provided, the modulus of the difference between the measured value of said amplitude relationship of said two non-adjacent detectors and the predicted value for said one of said polarisation states with a threshold value for said one of said polarisation states which is a constant for a given frequency of the incoming electromagnetic signal, and wherein the polarisation of the incoming electromagnetic signal is estimated in accordance with the polarisation code.

8. An apparatus for estimating polarisation of an incoming electromagnetic signal comprising:

an array of at least three differently directed detectors, each of which produces an output signal with a variation of amplitude with direction of arrival of the incoming signal which differs for different polarisations of incoming signal, means for determining a first amplitude relationship of output signals of two adjacent detectors and a second amplitude relationship of output signals of two non-adjacent detectors, and means for estimating said polarisation of the incoming signal from the first and second amplitude relationships without reference to phases of the output signals.

9. Apparatus as claimed in claim 8, wherein the two non-adjacent detectors are alternate detectors of the array.

10. Apparatus as claimed in claim 8, wherein the means for determining the amplitude relationships is adapted to employ, at any given moment in time, the detector at which the amplitude is largest as one of the pair of adjacent detectors, and the two detectors on either side thereof as the two non-adjacent detectors.

11. Apparatus as claimed in claim 10, wherein the means for determining the amplitude relationships comprises means to obtain the amplitude relationship for the two adjacent detectors by subtraction of logarithms of the two largest amplitudes from one another, and comprises means to obtain the amplitude relationship for the two nonadjacent detectors by subtraction of logarithms of the two smallest amplitudes from one another.

12. Apparatus as claimed in claim 8, wherein the means for establishing the polarisation comprises a look up table, means to address said look up table using a value of said amplitude relationship of said two adjacent detectors, means to read off from said look up table predicted values for the amplitude relationship of said two non-adjacent detectors for different polarisation states of said incoming electromagnetic signal, and means to compare said value of said amplitude relationship of said two non-adjacent detectors with said predicted values to determine the polarisation state of the incoming electromagnetic signal.

* * * * *